Feb. 18, 1958 J. O. MALOTT 2,823,483
COMBINATION FISH POLE AND SLINGSHOT AS A FISHING DEVICE
Filed Nov. 30, 1956
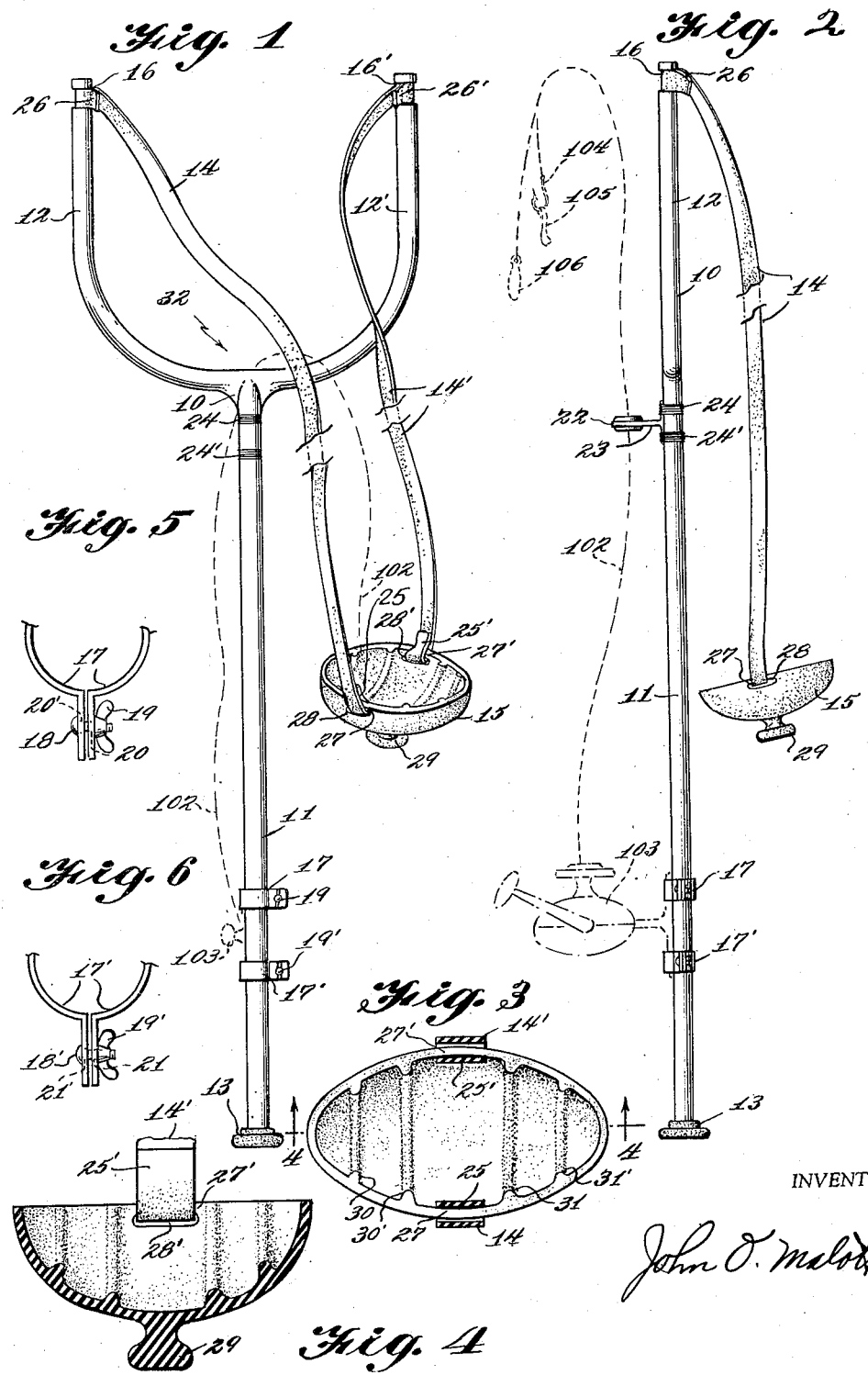
INVENTOR
John O. Malott : 2,823,483
Patented Feb. 18, 1958

2,823,483

COMBINATION FISH POLE AND SLINGSHOT AS A FISHING DEVICE

John O. Malott, Arlington, Va.

Application November 30, 1956, Serial No. 625,265

1 Claim. (Cl. 43—19)

The present invention relates to a combination fish pole and slingshot as a fishing device of improved construction, and has for a primary object provision of a compact fish pole of a modified type that can be provided with a reel or spinner for fishing and which fish pole is part of a combination frame with a slingshot of a modified type that can be used for casting artificial fish lure or fish hook, bait and sinker.

Another object of the invention is to provide a modified container, traditionally referred to as a "missile" container, cup or pocket, for artificial fish lure or fish hook, bait and sinker, said proposed container being adapted in size, shape and construction and having ridges on the inside thereof for easy and positive loading and casting of the contents of said container.

Another object of the invention is to provide a release knob on the back side of the modified container as a means for positive control of the container by the operator in creating tension on the resilient members or bands when getting ready to eject fish lure or fish hook, bait and sinker, and in releasing the tension on the resilient members or bands when actual cast is made without the necessity in either instance of any direct contact between the operator and the fish lure or fish hook, bait and sinker.

It is well known to those familiar with the use of fish poles under various fishing conditions that persons near the one who is casting may be endangered by the ordinary whipping around of a fish lure or fish hook, bait and sinker in the usual casting by means of a fish pole or throw line. Furthermore, trees or other obstructions may prevent safe and accurate casting by the conventional pole-casting method. With my invention, the casting may be done in a direction entirely forward from the operator, thus making it possible to reduce hazards to others and to aim or sight the slingshot in the direction of the desired cast. Furthermore, the improved construction of the container contributes to the possibility of the retention of artificial fish lure or fish hook, bait and sinker in said container preparatory to casting and contributes to the possibility of uninterrupted ejection of the contents of the container through the modified crotch of the slingshot in the casting operation, thus making it possible to reduce operational hazards to the operator and to others nearby.

Other objects and advantages will, to those skilled in the art to which my invention appertains, become apparent from the following descriptions in connection with the accompanying drawings in which:

Figure 1 shows a frontal elevation view of the combination fish pole and slingshot, having elastic bands and container pulled to one side to provide more detail, with a considerable portion of the bands broken away, and with an added ordinary fish line and spinner being indicated fragmentally in dotted lines to illustrate the slingshot portion of the combination fish pole and slingshot.

Figure 2 shows a side elevation view of the combination fish pole and slingshot shown in Figure 1, having elastic bands and container pulled to one side, with a considerable portion of the bands broken away, and with an added ordinary fish line and spinner being indicated fragmentally in dotted lines, and fish hook, bait and sinker being indicated also in dotted lines to illustrate the fish pole portion of the combination fish pole and slingshot.

Figure 3 is a view of the inside of the modified missile container showing elongated cup-like shape of the container adapted in shape, length and width and with four ridges running widthwise therein to facilitate positive loading of the container and positive retention in the container of the fish lure or fish hook, bait and sinker, and also showing a portion of elastic bands attached to said container, but which elastic bands are cut widthwise to provide more detail.

Figure 4 is a cross sectional view of the modified missile container shown in Figure 3, the cross sectional view being taken lengthwise of the container on line 4—4 of Figure 3 showing elongated cup-like shape of container adapted in shape, length and width and with four ridges running widthwise therein to facilitate positive loading of the container and positive retention in the container of the fish lure or fish hook, bait and sinker, and also showing release knob.

Figure 5 is a perspective view of strap 17 of Figure 1 disposed 90° relative to the same and with a considerable portion of the strap 17 broken away.

Figure 6 is a perspective view of strap 17' of Figure 1 disposed 90° relative to the same and with a considerable portion of strap 17' broken away.

Briefly, my invention, combination fish pole and slingshot as an improved device for casting and retrieving fish line and appropriate gear, comprises essentially a frame 10, handle 11, collar 13, two adjustable straps 17 and 17', fish-line guide 22, fish line guide frame 23, modified slingshot prongs 12 and 12' adapted as a continuation of frame 10 in the opposite direction from handle 11, and two elastic bands 14 and 14' secured at one end to said prongs 12 and 12' respectively, and at the other end to modified container 15, said container having four ridges on the inside thereof and a release knob 29 on the back thereof.

Referring to the drawing in detail, frame 10, handle 11, prongs 12 and 12' and collar 13, in effect form the main body or basic frame structure for the combination fish pole and slingshot, and may be cast, forged, molded or otherwise constructed of metal, plastic or other suitable material or materials in the form of either a solid or a tubular member for suitable strength, balance and rigidity and to avoid excessive weight.

Frame 10, as shown particularly in Figure 1, is extended in one direction to form handle 11, which becomes the main fishing pole portion of the device. Said frame 10 and handle 11 are also extended to form collar 13. In the opposite direction from handle 11, frame 10 is extended to form prongs 12 and 12', thus completing the basic frame structure or frame work for the modified slingshot or casting portion of the device. Prongs 12 and 12', conventionally referred to as "forks," project from the frame section in spaced relation to one another and are suitably constructed to support a pair of resilient bands 14 and 14'. Prongs 12 and 12', each of identical size, shape and construction, together with frame 10 form modified crotch 32 suitably wide and deep to permit uninterrupted passage through said crotch 32 of container 15 and the ordinary contents of container 15, when said contents are ejected in the casting operation hereinafter described. Normally, the overall length of handle 11, frame 10 and prongs 12 and 12' on models for fishing in rivers and lakes may be approximately twenty-eight inches, but the length would be greater on models for surf casting. Normally, the diameter of handle 11 is about one and one-half inches and the diameter of prongs 12 and 12' about seven-eighths of an inch except at recesses 16 and 16' where the diameter is about three-fourths of an inch. Collar 13 is a collar-type enlargement or band on the lower or butt end of handle 11 and is at the opposite end of handle 11 from frame 10. The outside diameter of collar 13, being about two inches, is larger than the outside diameter of handle 11, which is about one and one-half inches. Collar 13 is about one-half inch wide. Normally, collar 13 serves as a means to retain straps 17 and 17' on handle 11.

Straps 17 and 17' are ordinary straps of metal, plastic or other suitable material and are approximately one-sixteenth to one-eighth of an inch thick, one inch wide and seven inches long. It will be understood by those skilled in the art of assemblying fishing tackle that these straps 17 and 17' are bent almost around handle 11 and may be tightened or suitably adjusted to the approximate diameter of handle 11 and known member of reel or spinner 103 (not a part of this invention) as a means in securing to said handle 11 an ordinary or known reel or spinner 103. As shown in Figure 5, strap 17 may be adjusted by means of passing screw 18 through holes 20 and 20' and by tightening in the usual manner an ordinary wing nut 19 threaded upon screw 18. As shown in Figure 6, strap 17' may be adjusted by means of passing screw 18' through holes 21 and 21' and by tightening in the usual manner an ordinary wing nut 19' threaded upon screw 18'.

An ordinary fish-line guide 22, as shown in Figure 2, may be made of agate, metal, plastic or other suitable material and may be welded to, molded on or otherwise suitably secured in fish-line guide frame 23. Fish-line guide frame 23, as shown in Figure 2, may be made of metal, plastic or other suitable material and may be welded to, molded on, lashed or tied by cord 24 and 24' or otherwise suitably secured to handle 11. Fish-line guide 22 is a means to guide fish line 102 (not a part of this invention), thus to reduce the fouling of said line 102 when casting and fishing with the combination fish pole and slingshot, which operation is hereinafter described. Cord 24 and 24' may be an ordinary fibre cord waterproofed or otherwise suitably treated.

Fish line 102 and spinner 103 shown partially in Figures 1 and 2 and fish hook 104 (not a part of this invention), bait 105 (not a part of this invention), and sinker 106 (not a part of this invention) shown in Figure 2 may be of ordinary or known types usually used in sport fishing. Fish hook 104, bait 105, and sinker 106 are shown in said Figure 2 by dotted lines for the purpose of clarifying the description and illustrating the use of the invention as a fishing device. It is understood that those skilled in the art to which my invention appertains could substitute in the usual manner an artificial fish lure in lieu of fish hook 104, bait 105 and sinker 106 mentioned herein. Therefore, hereinafter, for the sake of brevity and clarity, reference to "fish hook 104, bait 105 and sinker 106" means "fish hook 104, bait 105 and sinker 106 or an ordinary or known artificial fish lure not shown in the attached drawing and not a part of the present invention." Furthermore, hereinafter, reference to "spinner 103" means "an ordinary or known fish reel or spinner 103."

Referring to Figures 1 and 3, bands 14 and 14' are the resilient or actuating members of the modified slingshot or casting portion of the present invention. Said bands 14 and 14' of suitable size and strength may be made of rubber or other elastic material. Normally, bands 14 and 14' are about one inch wide and twelve inches long on models for fishing in rivers and lakes, but may be larger on models for surf casting. Bands 14 and 14' are secured to container 15 by passing about one inch of ends 25 and 25' of bands 14 and 14', respectively, through apertures 28 and 28' respectively, by folding said ends 25 and 25' over arms 27 and 27', respectively, and over said bands 14 and 14', respectively, and by cementing, vulcanizing or otherwise securing said ends 25 and 25' to the respective bands 14 and 14'. Furthermore, the opposite ends 26 and 26' of said bands 14 and 14', respectively, are wrapped almost around prongs 12 and 12', respectively, at recesses 16 and 16', respectively, in such a manner that about one inch of ends 26 and 26' is folded over bands 14 and 14', respectively, and said ends 26 and 26' are suitably secured to said bands 14 and 14', respectively by cementing, vulcanizing or otherwise.

Container 15 as shown in Figures 1, 2, 3, and 4 and often referred to as a "missile" container is a modified slingshot container or cup adapted in size, shape, strength and construction for use in casting fish hook 104, bait 105 and sinker 106. Container 15 may be made of metal, plastic, hard rubber or other suitable material. Container 15 is about one inch wide, one inch deep and two and one-half inches long on models for ordinary fishing in rivers and lakes, but larger on models for surf fishing, container 15 being adapted in size for use with fish hooks, baits and sinkers or fish lures of different sizes for different fishing conditions. On models of the combination fish pole and slingshot of different sizes, the size of crotch 32 and the size of container 15 are suitably adjusted to permit uninterrupted passage of container 15 and of the contents of container 15 through crotch 32 in the casting operation. Container 15 has substantially the shape of an elongated cup, approximating the shape of a fifty-five percent portion of an ellipsoid-like shell cut lengthwise, thereby being adapted in shape to hold fish hook 104, bait 105 and sinker 106. Inside of container 15 are four ridges 30, 30', 31 and 31' running widthwise of said container 15 to facilitate positive loading and retention in container 15 of fish hook 104, bait 105 and sinker 106 preparatory to the casting operation. Furthermore, said ridges 30, 30', 31 and 31' serve as a means to control more effectively the ejection path of fish hook 104, bait 105 and sinker 106 in relation to prongs 12 and 12' until said fish hook 104, bait 105 and sinker 106 have passed completely through crotch 32. Container 15 has apertures 28 and 28', the sides of which are parallel to line 4—4 in Figure 3, thereby forming arms 27 and 27', respectively, the sides of which arms 27 and 27' are also parallel to line 4—4 in Figure 3. Arms 27 and 27' are made of the same material as is used in making container 15. Arms 27 and 27' are about one inch long. Bands 14 and 14', as heretofore described, are passed almost around arms 27 and 27', respectively, in securing said bands 14 and 14' to container 15. Said container 15 has release knob 29 as shown particularly in Figure 4, which knob 29 is welded to or molded on or otherwise suitably secured to central portion of the back of container 15. Release knob 29 may be made of metal, plastic, hard rubber or other suitable material. Release knob 29 is adapted to be gripped by thumb and forefinger of the operator when creating tension on bands 14 and 14', when getting ready to eject or propel fish hook 104, bait 105 and sinker 106 forward from the operator in the casting operation. Furthermore, release knob 29 is adapted for being released in the casting operation without the necessity of any direct contact between the operator and fish hook 104, bait 105 and sinker 106.

The following is a brief description of the operation and use of my invention, combination fish pole and slingshot, shown in the accompanying drawing. It is believed that the foregoing description of my invention together with the following description of the operation of my invention will enable others skilled in the art to which it appertains to manufacture and to use the same, reference being had to the accompanying drawing and to numbers of reference marked thereon. Throughout the following description, it is assumed that the operator is right handed; that any person, either right or left handed, who is skilled in the art of fishing, casting and recovering fish line and gear with or without fish could make the necessary adjustments in the use of my invention; that the operator has a combination fish pole and slingshot as shown in the accompanying drawing; that the operator has an ordinary spinner 103 with fish line 102 wound thereon in the usual manner; and that the operator has fish hook 104, bait 105 and sinker 106.

In preparing to use the combination fish pole and slingshot, the operator in the usual manner secures spinner 103 to handle 11 by adjusting straps 17 and 17' on handle 11 and over known member of spinner 103 and by suitably tightening wing nuts 19 and 19' on screws 18 and 18', respectively. The operator threads fish line 102 in the usual manner through fish-line guide 22. In the usual manner, the operator attaches to fish line 102 appropriate fish hook 104 and sinker 106 and attaches bait 105 to fish hook 104. The operator sets or adjusts spinner 103 in the usual manner to release fish line 102, when the cast is made.

Particular reference is made to Figure 1 in explaining the manner in which the slingshot portion of the invention may be used in casting fish line 102, fish hook 104, bait 105 and sinker 106.

In preparing to cast, the operator faces the general direction of the proposed cast. A right-handed operator normally holds firmly the combination fish pole and slingshot with his left hand, gripping handle 11 near frame 10. Normally, said combination fish pole and slingshot is held in almost an upright or perpendicular position and forward from the operator's body in the general direction of the desired cast. Preparatory to loading container 15, the operator untangles any knots or untwists any twists in bands 14 and 14' so that bands 14 and 14' and container 15 are suspended normally in the well known manner from prongs 12 and 12'. With the right hand, the operator pulls through crotch 32 and toward his body about one foot of fish line 102 together with fish hook 104, bait 105 and sinker 106. The operator places fish hook 104 with bait 105 and sinker 106 firmly against ridges 30, 30', 31 and 31' in container 15, being careful then and thereafter not to dislodge any of the contents from said container 15, pending the usual casting of contents therefrom. The operator firmly grips release knob 29 between his thumb and fore finger of his right hand.

Being about ready to cast, the operator grips handle 11 more firmly with his left hand, moves his left hand forward at arm's length in the direction of the desired cast and tenses his left arm. The operator gradually increases the tension on bands 14 and 14' by pulling release knob 29 with his right hand and right arm rearwardly and in the direction away from prongs 12 and 12' until the desired tension, direction and elevation of bands 14 and 14' are attained for the cast. The operator quickly releases his grip on release knob 29, thereby causing fish hook 104, bait 105, sinker 106 and a portion of fish line 102 to be ejected with force from container 15 through crotch 32 in the casting operation.

After the forementioned casting, a right-handed operator would normally with his right hand grip handle 11 suitably between strap 17 and frame 10 to hold the combination fish pole and slingshot in a balanced position for the fishing operation. A right-handed operator normally with his left hand would adjust or set spinner 103 for reeling in line 102 and would take up the slack, if any, in fish line 102 by suitably winding said fish line 102 on spinner 103 in the well known manner. In case of a strike or bite by a fish, the operator would jerk handle 11 in the opposite direction from the fish, causing additional tension on line 102 and would endeavor to set the hook in the fish. Assuming the operator caught a fish, the operator would wind fish line 102 on spinner 103 in the usual manner to bring the fish to the operator.

Whereas the foregoing description of the casting and fishing operations are appropriate for a right-handed operator, references to the right and left hands and arms would normally be reversed in a description of such operations by a left-handed operator.

While I have shown only the preferred form of my invention, I wish to have it understood that various changes and modifications may be made within the scope of the claim attached hereto without departing from the spirit of the invention.

What I claim as new and desire to protect by Letters Patent is:

A combination bait caster and fish pole comprising an elongated pole having at one end thereof a frame including two prongs, a fishing reel having a line wound thereon and a lure connected to the end thereof, means for detachably connecting said fishing reel to said fishing pole at the opposite end thereof, a line guide secured to said pole between said frame and the reel connecting means, said guide being adapted to have the line threaded therethrough, a bait caster including a pair of elastic bands secured at one of their ends each to a prong of the frame and having a cup secured to the free ends of said bands in such a manner as to receive said lure whereby the same can be projected out into space by said bait caster when the same is actuated.

References Cited in the file of this patent

UNITED STATES PATENTS

| | | |
|---|---|---|
| 596,799 | Andrews | Jan. 4, 1898 |
| 1,376,260 | Davis | Apr. 26, 1921 |
| 2,089,744 | Golden | Aug. 10, 1937 |

FOREIGN PATENTS

| | | |
|---|---|---|
| 80,964 | Norway | Nov. 3, 1952 |
| 935,277 | France | Feb. 2, 1948 |